(12) United States Patent
Yamakage et al.

(10) Patent No.: US 12,323,030 B2
(45) Date of Patent: Jun. 3, 2025

(54) MOTOR-DRIVEN COMPRESSOR AND HOUSING FOR MOTOR-DRIVEN COMPRESSOR

(71) Applicant: KABUSHIKI KAISHA TOYOTA JIDOSHOKKI, Kariya (JP)

(72) Inventors: Shumpei Yamakage, Kariya (JP); Junya Yano, Kariya (JP); Yusuke Kinoshita, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 300 days.

(21) Appl. No.: 18/177,879

(22) Filed: Mar. 3, 2023

(65) Prior Publication Data

US 2023/0307985 A1 Sep. 28, 2023

(30) Foreign Application Priority Data

Mar. 23, 2022 (JP) .................. 2022-046924

(51) Int. Cl.
| | |
|---|---|
| H02K 5/22 | (2006.01) |
| B60H 1/32 | (2006.01) |
| F25B 49/02 | (2006.01) |
| H02K 11/33 | (2016.01) |
| H01R 27/02 | (2006.01) |

(52) U.S. Cl.
CPC .......... *H02K 5/225* (2013.01); *B60H 1/3226* (2013.01); *F25B 49/022* (2013.01); *H02K 11/33* (2016.01); *F25B 2600/021* (2013.01); *H01R 27/02* (2013.01); *H01R 2201/10* (2013.01)

(58) Field of Classification Search
CPC .......... H02K 5/225; H02K 11/33; H02K 7/14; H02K 11/35; B60H 1/3226; F25B 49/022; F25B 2600/021; H01R 27/02; H01R 2201/10; H01R 24/66; F04B 35/04; H02M 7/003; H02P 27/06; H05K 5/0217; H05K 7/02
See application file for complete search history.

(56) References Cited

U.S. PATENT DOCUMENTS

| | | |
|---|---|---|
| 2012/0160596 A1 | 6/2012 | Yamasaki |
| 2013/0202463 A1 | 8/2013 | Enami et al. |
| 2014/0294628 A1 | 10/2014 | Yano |
| 2015/0326090 A1 | 11/2015 | Arashi |
| 2022/0052602 A1 | 2/2022 | Jin et al. |

FOREIGN PATENT DOCUMENTS

| | | | |
|---|---|---|---|
| DE | 102011000179 A1 * | 7/2011 | ............ F04B 35/04 |
| DE | 10 2011 056 396 A | 6/2012 | |
| DE | 10 2014 104 332 A1 | 7/2015 | |

(Continued)

*Primary Examiner* — Mohamad A Musleh
(74) *Attorney, Agent, or Firm* — Sughrue Mion, PLLC

(57) ABSTRACT

A motor-driven compressor and a housing for the motor-driven compressor are provided. A power line connector and a communication line connector are arranged on an external surface of a housing. A first terminal of an interlocking communication line is located in the power line connector. A second terminal of the interlocking communication line is located in the communication line connector. The interlocking communication line is routed on the external surface from the first terminal to the second terminal.

4 Claims, 2 Drawing Sheets

(56) References Cited

FOREIGN PATENT DOCUMENTS

| | | | |
|---|---|---|---|
| DE | 11 2013 003 991 B4 | 2/2019 | |
| EP | 2623786 A1 * | 8/2013 | ............. F04B 35/04 |
| JP | 2012-207641 A | 10/2012 | |
| JP | 2013-160090 A | 8/2013 | |
| JP | 2014-034960 A | 2/2014 | |
| JP | 2015050873 A * | 3/2015 | ............. F01C 21/10 |
| JP | 2020-058123 A | 4/2020 | |

\* cited by examiner

MOTOR-DRIVEN COMPRESSOR AND HOUSING FOR MOTOR-DRIVEN COMPRESSOR

BACKGROUND

1. Field

The following description relates to a motor-driven compressor and a housing for the motor-driven compressor.

2. Description of Related Art

A motor-driven compressor includes a compression unit, an electric motor, an inverter, and a housing. The compression unit compresses fluid. The electric motor drives the compression unit. The inverter drives the electric motor. The housing accommodates the compression unit, the electric motor, and the inverter. The housing includes an inverter accommodating portion that accommodates the inverter and a lid that closes an opening of the inverter accommodating portion.

Japanese Laid-Open Patent Publication No. 2014-034960 describes a motor-driven compressor that includes a power line connector and a communication line connector. The power line connector and the communication line connector are arranged on a lid. The power line connector and the communication line connector are electrically connected to the inverter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor-driven compressor is provided. The motor-driven compressor includes a compression unit that compresses fluid, an electric motor that drives the compression unit, and an inverter that drives the electric motor. The motor-driven compressor further includes a housing that accommodates the compression unit, the electric motor, and the inverter. The motor-driven compressor further includes a power line connector arranged on the housing. The power line connector supplies power to the inverter when connected to a first vehicle-side connector. The motor-driven compressor further includes a communication line connector arranged on the housing. The communication line connector sends a control signal that drives the compression unit to the inverter when connected to a second vehicle-side connector.

The motor-driven compressor further includes an interlocking communication line routed between the power line connector and the communication line connector. The interlocking communication line includes a first terminal at one end and a second terminal at another end, and the interlocking communication line is connected to a vehicle-side interlocking wire when the power line connector is connected to the first vehicle-side connector and the communication line connector is connected to the second vehicle-side connector. The power line connector and the communication line connector are arranged on an external surface of the housing. The first terminal of the interlocking communication line is located in the power line connector. The second terminal of the interlocking communication line is located in the communication line connector. The interlocking communication line is routed on the external surface from the first terminal to the second terminal.

With the above structure, when the layout of the interlocking communication line is changed in accordance with the use of the motor-driven compressor, for example, with a request from a user of the motor-driven compressor, the configuration of the inverter does not need to be changed. In other words, the above structure increases the flexibility in the configuration of the inverter as compared when the interlocking communication line is routed on the board of the inverter.

The communication line connector may include an interlocking communication line. The interlocking communication line is used, for example, to check the connection of the power line connector. The interlocking communication line is typically routed on the board of the inverter. When the layout of the interlocking communication line is changed in accordance with the use of the motor-driven compressor, the configuration of the inverter electrically connected to the interlocking communication line is subject to change. Thus, when the layout of the interlocking communication line needs to be considered, the flexibility in the configuration of the inverter may be reduced. The above structure eliminates such a situation.

The above motor-driven compressor may further include a connection portion that integrally connects the power line connector to the communication line connector. The interlocking communication line may be arranged inside the connection portion. The interlocking communication line may be connected to the power line connector and the communication line connector.

With the above structure, routing of the interlocking communication line for the motor-driven compressor is completed when the power line connector and the communication line connector are arranged for the motor-driven compressor. This reduces the number of steps in the manufacturing process of the motor-driven compressor.

In the above motor-driven compressor, the housing may include an accommodating recess that accommodates the inverter, and an inverter cover that closes the accommodating recess. The external surface of the housing may be an external surface of the inverter cover.

With the above structure, the interlocking communication line can be routed on the inverter cover when the inverter cover is detached from the motor-driven compressor. This facilitates routing of the interlocking communication line.

According to the present disclosure, the flexibility in the configuration of the inverter is increased.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A motor-driven compressor according to an embodiment will now be described with reference to FIGS. 1 and 2. The motor-driven compressor of the present embodiment is used in, for example, a vehicle air conditioner.

Motor-Driven Compressor

Figure 1:
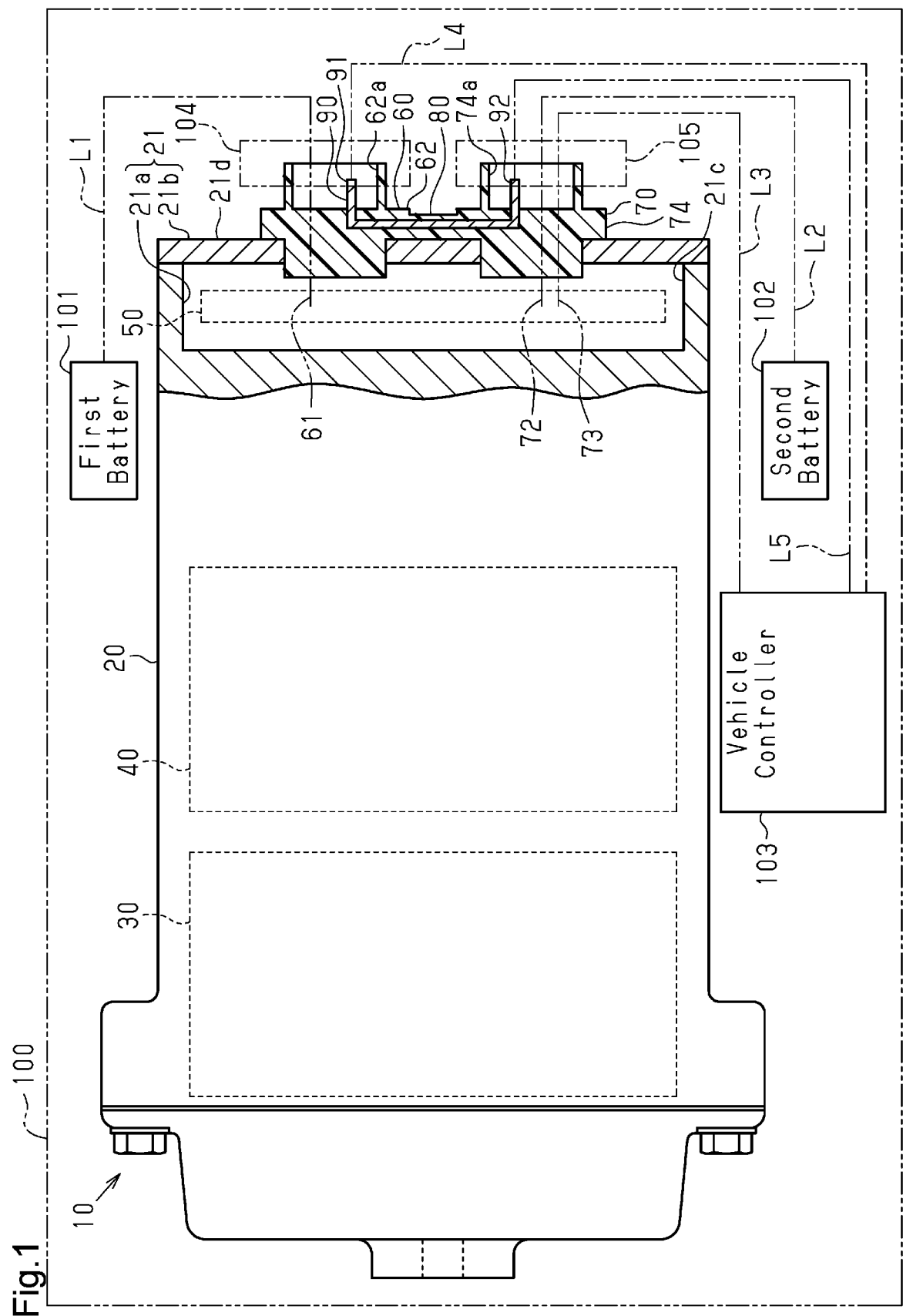
FIG. 1 is a schematic view of a motor-driven compressor according to a first embodiment.

As shown in FIG. 1, the motor-driven compressor 10 includes a housing 20, a compression unit 30, an electric motor 40, and an inverter 50. The housing 20 is tubular. The housing 20 is made of metal. For example, the housing 20 is made of aluminum. The housing 20 is formed by housing components. The housing components of the housing 20 can be separated in the axial direction of the housing 20.

The compression unit 30 compresses refrigerant serving as fluid. The electric motor 40 drives the compression unit 30. The inverter 50 drives the electric motor 40. The housing 20 accommodates the compression unit 30, the electric motor 40, and the inverter 50. The compression unit 30, the electric motor 40, and the inverter 50 are arranged in this order in the axial direction of the housing 20.

The electric motor 40 is driven when power is supplied from the inverter 50. The compression unit 30 is of a scroll type including a stationary scroll and an orbiting scroll (not shown). The compression unit 30, when driven by the electric motor 40, compresses refrigerant drawn into the housing 20.

The housing 20 includes an inverter accommodating portion 21. The inverter accommodating portion 21 includes an accommodating recess 21a that accommodates the inverter 50. That is, the housing 20 includes the accommodating recess 21a, which accommodates the inverter 50. In the present embodiment, the accommodating recess 21a includes an opening 21c that is open outward in the axial direction of the housing 20. The inverter accommodating portion 21 includes an inverter cover 21b. The inverter cover 21b closes the opening 21c. That is, the housing 20 includes the inverter cover 21b that closes the accommodating recess 21a. The inverter cover 21b includes an exposed surface 21d. The exposed surface 21d is a surface of the inverter cover 21b that is located at a side opposite to the accommodating recess 21a. The exposed surface 21d is the surface of the inverter cover 21b that is exposed to the outside. That is, the exposed surface 21d is an external surface of the inverter cover 21b. The inverter accommodating portion 21 includes the exposed surface 21d, which is exposed to the outside. That is, the exposed surface 21d is an external surface of the housing 20.

Power Line Connector, Communication Line Connector, Connection Portion, Interlocking Communication Line The motor-driven compressor 10 includes a power line connector 60, a communication line connector 70, a connection portion 80, and interlocking communication lines 90.

The power line connector 60 and the communication line connector 70 are arranged on the inverter accommodating portion 21. That is, the power line connector 60 and the communication line connector 70 are arranged on the housing 20. Specifically, the power line connector 60 and the communication line connector 70 are arranged on the exposed surface 21d. That is, the power line connector 60 and the communication line connector 70 are arranged on the external surface of the housing 20.

The power line connector 60 includes a first power terminal 61 and a first case 62. The first case 62 is formed by a plastic member. The first case 62 is arranged on the exposed surface 21d. The first case 62 partially extends through the inverter cover 21b. The first case 62 is tubular and has a closed end. The first case 62 includes a first connection port 62a. The first power terminal 61 extends through the inverter cover 21b and the bottom of the first case 62. The first power terminal 61 is electrically connected to the inverter 50. The first power terminal 61 includes a first end (left end in FIG. 1) that is electrically connected to a switching element, a capacitor, or the like (not shown) of the inverter 50. The first power terminal 61 includes a second end (right end in FIG. 1) that is located inside the first connection port 62a. In FIG. 1, the first power terminal 61 is schematically indicated by part of a single long-dash double-short-dash line for illustrative purposes. In practice, the first power terminal 61 includes a positive electrode and a negative electrode.

The communication line connector 70 includes a second power terminal 72, a control terminal 73, and a second case 74. The second case 74 is formed by a plastic member. The second case 74 is arranged on the exposed surface 21d. The second case 74 partially extends through the inverter cover 21b. The second case 74 is tubular and has a closed end. The second case 74 includes a second connection port 74a. The second power terminal 72 and the control terminal 73 extend through the inverter cover 21b and the bottom of the second case 74. The second power terminal 72 and the control terminal 73 are electrically connected to the inverter 50. The second power terminal 72 and the control terminal 73 each include a first end (left end in FIG. 1) that is electrically connected to the control unit of the inverter 50. The control unit is, for example, a control circuit including a central processing unit (CPU). The second power terminal 72 and the control terminal 73 each include a second end (right end in FIG. 1) that is located inside the second connection port 74a. In FIG. 1, the second power terminal 72 is schematically indicated by part of a single long-dash double-short-dash line for illustrative purposes. In practice, the second power terminal 72 includes a positive electrode and a negative electrode. In other words, the second power terminal 72 supplies the inverter 50 with power to operate the control unit of the inverter 50. The control terminal 73 is schematically indicated by part of a single long-dash double-short-dash line for illustrative purposes. In practice, the control terminal 73 includes terminals. The number of the control terminal 73 may be determined in accordance with the number of control signals sent to the control unit of the inverter 50. The control terminal 73 receives control signals that drive the compression unit 30.

Figure 2:
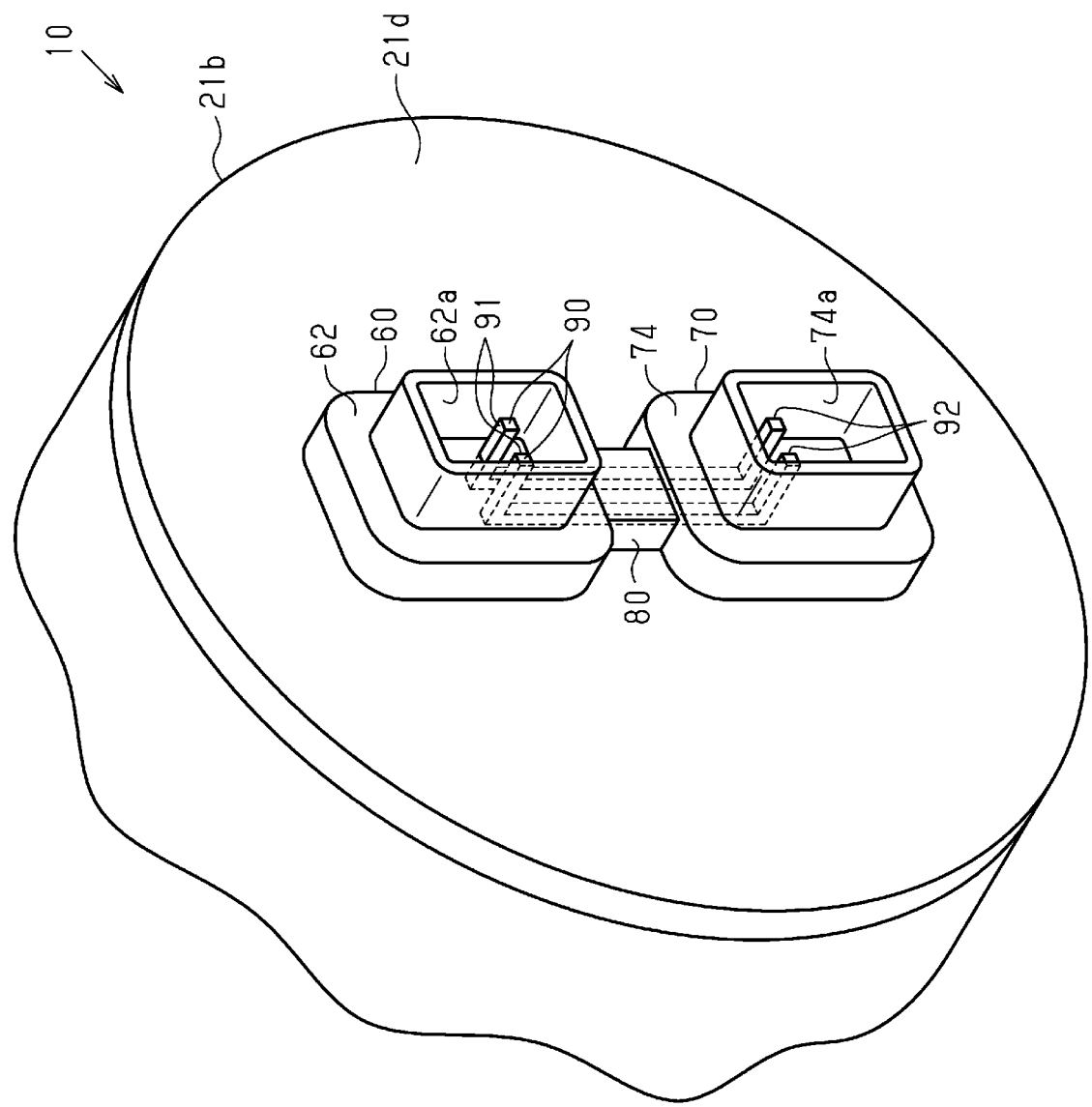
FIG. 2 is a perspective view showing an interlocking wire routed in the first embodiment illustrated in FIG. 1.

As shown in FIGS. 1 and 2, the connection portion 80 connects the first case 62 of the power line connector 60 to the second case 74 of the communication line connector 70. The connection portion 80 is formed integrally with the first case 62 and the second case 74. That is, the connection portion 80 integrally connects the power line connector 60 to the communication line connector 70. The connection portion 80 is formed by a plastic member. The connection portion 80 is arranged along the exposed surface 21d.

The interlocking communication lines 90 are, for example, flat bus bars. The interlocking communication lines 90 are routed between the power line connector 60 and the communication line connector 70. Specifically, the interlocking communication lines 90 each include a first terminal 91 at one end that is arranged at the inner side of the first connection port 62a of the first case 62. That is, the first terminal 91 of the interlocking communication line 90 is located in the power line connector 60. The interlocking communication lines 90 each include a second terminal 92 at another end that is arranged at the inner side of the second connection port 74a of the second case 74. That is, the second terminal 92 of the interlocking communication line 90 is located in the communication line connector 70. The interlocking communication lines 90 are arranged inside the first case 62, the connection portion 80, and the second case 74. The interlocking communication lines 90 are covered by the plastic members except portions that are located at the inner sides of the first connection port 62a and the second connection port 74a. The portions of the interlocking communication lines 90 passing through the inside of the connection portion 80 extend along the exposed surface 21d. Thus, the interlocking communication lines 90 are routed on the exposed surface 21d and do not extend through the inverter cover 21b. In other words, the interlocking communication lines 90 are routed on the external surface of the housing 20 from the first terminals 91 to the second terminals 92. The interlocking communication lines 90 are formed integrally with the power line connector 60 and the communication line connector 70. Further, the interlocking communication lines 90 are not routed on the board of the inverter 50. In FIG. 2, the first power terminal 61, the second power terminal 72, and the control terminal 73 are not shown for illustrative purposes.

Relationship between Motor-Driven Compressor and Vehicle

The motor-driven compressor 10 of the present embodiment is applied to the refrigerant compressor of a vehicle air conditioner. The motor-driven compressor 10 is installed in the vehicle 100. The vehicle 100 includes a first battery 101, a second battery 102, a vehicle controller 103, a first vehicle-side connector 104, and a second vehicle-side connector 105. The vehicle 100 includes a first power line L1, a second power line L2, a normal communication line L3, a first vehicle-side interlocking wire L4, and a second vehicle-side interlocking wire L5. The voltage of the first battery 101 is higher than the voltage of the second battery 102. Further, the first vehicle-side interlocking wire L4 and the second vehicle-side interlocking wire L5 are a vehicle-side interlocking wire described in the claims. The vehicle controller 103 executes an interlock function when the vehicle controller 103 cannot check the connections of the first vehicle-side connector 104 and the second vehicle-side connector 105 to the motor-driven compressor 10. The checking operation and the interlock function will be described later.

The first power line L1 electrically connects the first battery 101 to the first vehicle-side connector 104. The second power line L2 electrically connects the second battery 102 to the second vehicle-side connector 105. The normal communication line L3 electrically connects the vehicle controller 103 to the second vehicle-side connector 105.

The first vehicle-side connector 104 is connected to the first connection port 62a of the power line connector 60. The power stored in the first battery 101 is supplied to the inverter 50 by the first power line L1, the first vehicle-side connector 104, and the first power terminal 61 of the power line connector 60. That is, the power is supplied to the inverter 50 when the power line connector 60 is connected to the first vehicle-side connector 104.

The second vehicle-side connector 105 is connected to the second connection port 74a of the communication line connector 70. The power stored in the second battery 102 is supplied to the inverter 50 by the second power line L2, the second vehicle-side connector 105, and the second power terminal 72 of the communication line connector 70. That is, the power is supplied to the inverter 50 when the communication line connector 70 is connected to the second vehicle-side connector 105.

The vehicle controller 103 outputs control signals to control driving of the motor-driven compressor 10. The control signals output from the vehicle controller 103 are sent to the inverter 50 by the normal communication line L3, the second vehicle-side connector 105, and the control terminal 73 of the communication line connector 70. That is, the control signals that drive the compression unit 30 are sent to the inverter 50 when the communication line connector 70 is connected to the second vehicle-side connector 105.

The first vehicle-side interlocking wire L4 includes a first end that is electrically connected to the first terminals 91 of the interlocking communication lines 90 by the first vehicle-side connector 104. The first vehicle-side interlocking wire L4 includes a second end that is electrically connected to the vehicle controller 103.

The second vehicle-side interlocking wire L5 includes a first end that is electrically connected to the second terminals 92 of the interlocking communication lines 90 by the second vehicle-side connector 105. The second vehicle-side interlocking wire L5 includes a second end that is electrically connected to the vehicle controller 103. That is, the interlocking communication lines 90 are connected to the vehicle-side interlocking wires (L4, L5) when the power line connector 60 is connected to the first vehicle-side connector 104 and the communication line connector 70 is connected to the second vehicle-side connector 105.

In the following, the first vehicle-side connector 104 is connected to the power line connector 60 and the second vehicle-side connector 105 is connected to the communication line connector 70. In this case, an electric signal output from the vehicle controller 103 is sent to the interlocking communication lines 90 via one of the first vehicle-side interlocking wire L4 and the second vehicle-side interlocking wire L5. The electric signal returns to the vehicle controller 103 via the other one of the first vehicle-side interlocking wire L4 and the second vehicle-side interlocking wire L5. The vehicle controller 103 determines that the first vehicle-side connector 104 and the second vehicle-side connector 105 are properly connected to the motor-driven compressor 10 when the electric signal output to the first vehicle-side interlocking wire L4 or the second vehicle-side interlocking wire L5 returns to the vehicle controller 103.

In the following, the first vehicle-side connector 104 is not connected to the power line connector 60, or the second vehicle-side connector 105 is not connected to the communication line connector 70. In this case, an electric signal output from the vehicle controller 103 to one of the first vehicle-side interlocking wire L4 and the second vehicle-side interlocking wire L5 does not return to the vehicle controller 103. The vehicle controller 103 determines that the first vehicle-side connector 104 or the second vehicle-side connector 105 is not properly connected to the motor-driven compressor 10.

In the present embodiment, the interlocking communication lines 90 of the motor-driven compressor 10 are used so that the vehicle controller 103 determines whether the first vehicle-side connector 104 and the second vehicle-side connector 105 are connected to the motor-driven compressor 10. When the vehicle controller 103 cannot check the connections of the first vehicle-side connector 104 and the second vehicle-side connector 105 to the motor-driven compressor 10, the vehicle controller 103 activates the interlock function to, for example, stop the operation of the vehicle air conditioner.

Operation and Advantages of Present Embodiment

An Operation and Advantages of the Present Embodiment Will Now be Described.

(1) The interlocking communication lines 90 are routed on the exposed surface 21d of the inverter cover 21b. Thus, when the layout of the interlocking communication lines 90 is changed in accordance with the use of the motor-driven compressor 10, the configuration of the inverter 50 does not need to be changed since the interlocking communication lines 90 are not routed on the board of the inverter 50. In other words, the motor-driven compressor 10 of the present embodiment increases the flexibility in the configuration of the inverter 50 as compared when the interlocking communication lines 90 are routed on the board of the inverter 50.

(2) The motor-driven compressor 10 includes the connection portion 80 integrally connecting the power line connector 60 to the communication line connector 70. The interlocking communication lines 90 are arranged inside the connection portion 80 and connected to the power line connector 60 and the communication line connector 70. Thus, routing of the interlocking communication lines 90 for the motor-driven compressor 10 is completed when the power line connector 60 and the communication line connector 70 are arranged for the motor-driven compressor 10. This reduces the number of steps in the manufacturing process of the motor-driven compressor 10.

(3) The interlocking communication lines 90 are routed along the exposed surface 21d of the inverter cover 21b. Thus, the interlocking communication lines 90 can be routed on the inverter cover 21b when the inverter cover 21b is detached from the motor-driven compressor 10. This facilitates routing of the interlocking communication lines 90.

(4) The interlocking communication lines 90 are not routed on the board of the inverter 50. Thus, when the inverter 50 is configured, routing of the interlocking communication lines 90 does not need to be considered. This minimizes a delay in the progress of the configuring of the inverter 50 due to the use of the motor-driven compressor 10.

Modifications

The above-described embodiment may be modified as follows. The above-described embodiment and the following modifications can be combined as long as the combined modifications remain technically consistent with each other.

In the present embodiment, the power line connector 60 and the communication line connector 70 are arranged on the exposed surface 21d of the inverter cover 21b. Instead, the power line connector 60 and the communication line connector 70 may be arranged on a surface that is exposed to the outside and is included in peripheral walls that define the accommodating recess 21a of the inverter accommodating portion 21. In this case, the interlocking communication lines 90 are routed on the exposed surface of the peripheral walls, which define the accommodating recess 21a of the inverter accommodating portion 21. In other words, the exposed surface of the peripheral walls, which define the accommodating recess 21a of the inverter accommodating portion 21, may be the external surface of the housing 20 on which the interlocking communication lines 90 are routed.

In the present embodiment, the inverter accommodating portion 21 may be formed so that the opening 21c of the accommodating recess 21a is open in the direction that is orthogonal to the axis of the housing 20.

In the present embodiment, the connection portion 80 may be omitted. In this case, portions of the interlocking communication lines 90 between the power line connector 60 and the communication line connector 70 may be slightly separated from the exposed surface 21d of the inverter cover 21b.

In the present embodiment, the interlocking communication lines 90 are flat bus bars. Instead, the interlocking communication lines 90 may be flexible wires.

In the present embodiment, the vehicle controller 103 executes the interlock function when the vehicle controller 103 cannot check the connections of the first vehicle-side connector 104 and the second vehicle-side connector 105 to the motor-driven compressor 10. The interlock function executed by the vehicle controller 103 may be changed.

In each embodiment, the compression unit 30 does not have to be of a scroll type and may be a piston type or a vane type.

In each embodiment, the motor-driven compressor 10 may be installed in a fuel cell electric vehicle and the compression unit 30 compresses air, which is fluid supplied to a fuel cell.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor, comprising:
a compression unit that compresses fluid;
an electric motor that drives the compression unit;
an inverter that drives the electric motor;
a housing that accommodates the compression unit, the electric motor, and the inverter;
a power line connector arranged on the housing, wherein the power line connector supplies power to the inverter when connected to a first vehicle-side connector;
a communication line connector arranged on the housing, wherein the communication line connector sends a control signal that drives the compression unit to the inverter when connected to a second vehicle-side connector; and
an interlocking communication line routed between the power line connector and the communication line connector, wherein the interlocking communication line includes a first terminal at one end and a second terminal at another end, and the interlocking communication line is connected to a vehicle-side interlocking wire when the power line connector is connected to the first vehicle-side connector and the communication line connector is connected to the second vehicle-side connector, wherein the power line connector and the communication line connector are arranged on an external surface of the housing, the first terminal of the interlocking communication line is located in the power line connector, the second terminal of the interlocking communication line is located in the communication line connector, and the interlocking communication line is routed on the external surface from the first terminal to the second terminal.

2. The motor-driven compressor according to claim 1, further comprising a connection portion that integrally connects the power line connector to the communication line connector, wherein the interlocking communication line is arranged inside the connection portion, and the interlocking communication line is connected to the power line connector and the communication line connector.

3. The motor-driven compressor according to claim 1, wherein the housing includes an accommodating recess that accommodates the inverter, and an inverter cover that closes the accommodating recess, and the external surface of the housing is an external surface of the inverter cover.

4. A housing for a motor-driven compressor, the housing comprising:

an external surface;

a power line connector arranged on the external surface;

a communication line connector arranged on the external surface; and an interlocking communication line for connection to a vehicle-side interlocking wire when the power line connector is connected to a first vehicle-side connector and the communication line connector is connected to a second vehicle-side connector, wherein the interlocking communication line includes a first terminal located in the power line connector and a second terminal located in the communication line connector, wherein the interlocking communication line is routed between the power line connector and the communication line connector on the external surface from the first terminal to the second terminal.

* * * * *